No. 752,561. PATENTED FEB. 16, 1904.
G. W. JOHNSON.
SUBSOIL PLOW.
APPLICATION FILED MAR. 17, 1903.
NO MODEL.

Witnesses
Charles Morgan.
Harry Ellis Chandler.

Inventor
G. W. JOHNSON.
by
Chandler & Chandler
Attorneys

THE NORRIS PETERS CO., PHOTO-LITHO., WASHINGTON, D. C.

No. 752,561. Patented February 16, 1904.

UNITED STATES PATENT OFFICE.

GEORGE W. JOHNSON, OF MANASSAS, VIRGINIA.

SUBSOIL-PLOW.

SPECIFICATION forming part of Letters Patent No. 752,561, dated February 16, 1904.

Application filed March 17, 1903. Serial No. 148,242. (No model.)

*To all whom it may concern:*

Be it known that I, GEORGE W. JOHNSON, a citizen of the United States, residing at Manassas, in the county of Prince William, State of Virginia, have invented certain new and useful Improvements in Subsoil-Plows; and I do hereby declare the following to be a full, clear, and exact description of the invention, such as will enable others skilled in the art to which it appertains to make and use the same.

This invention relates to plows in general; and it has for its object to provide a plow which shall be particulary adapted for use in loosening up the subsoil after the moldboard-plow has turned over the top soil, a further object of the invention being to provide a plow which will be simple in construction and which will be most durable, so as to withstand the heavy strains incident to subsoil-plowing.

A further object of the invention is to provide a plow having means for attachment of different numbers of draft-animals thereto in such manner that they will be kept off of the plowed ground, it being understood that the present plow in use follows directly behind the moldboard-plow.

Figure 1:
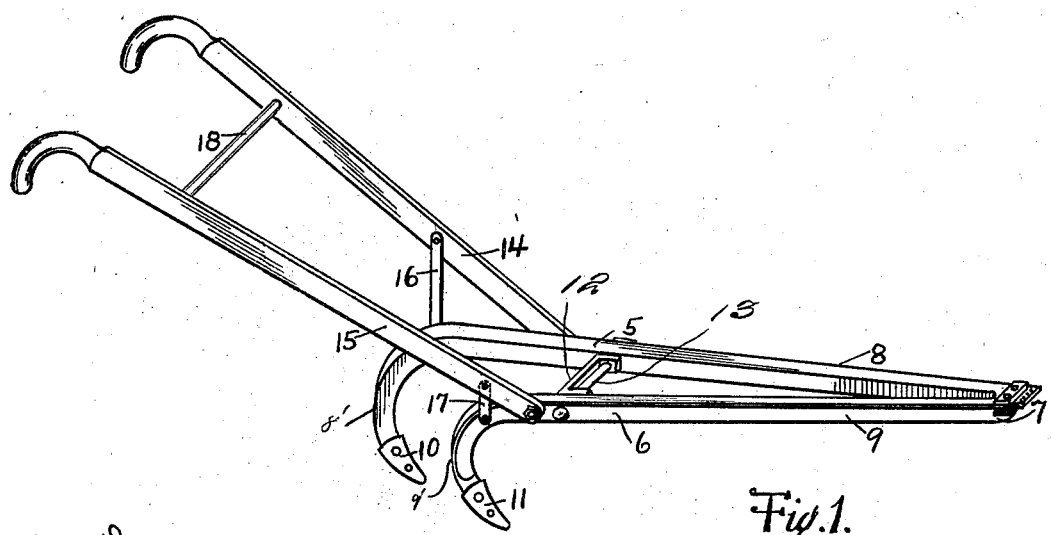
Figure 2:
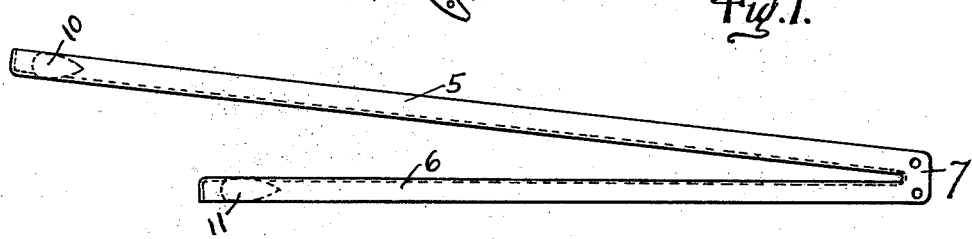
Figure 3:
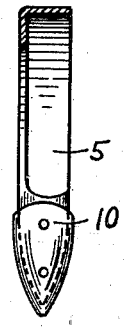
Figure 4:
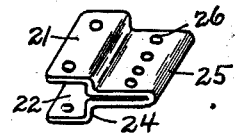

In the drawings forming a portion of this specification, and in which like numerals of reference indicate similar parts in the several views, Figure 1 is a perspective view of a plow embodying the present invention. Fig. 2 is a top plan view of the double beam. Fig. 3 is a detail perspective view of the clevis. Fig. 4 is a front elevation of one of the blades of a plow and the adjacent portion of the plow-beam.

Referring now to the drawings, the present plow comprises a double beam which is preferably formed of a single metal bar the end portions of which are curved downwardly and toward each other in hook shape, after which the bar is bent upon itself at a point nearer to one end than to the other, so as to form the two divergent members 5 and 6, connected at their front portions by the integral web 7 and having the downwardly and forwardly directed stock portions 8' and 9'. The angle between the members 5 and 6 and their relative lengths are such that the stock portions are spaced laterally a distance of approximately five inches, while the stock 8' stands approximately ten inches in the rear of the stock 9'. These two stocks are therefore separated laterally a distance less than the distance between two furrows, so that the plow may be drawn behind the plow with its forward stock in the furrow and with its rear stock adjacent to the unplowed ground.

The front faces of the stocks are rounded and the concavo-convex blades 10 and 11 are bolted thereto. These blades in practice are approximately two inches wide and are long, so that they reach below the stocks and into the subsoil a sufficient depth to thoroughly stir up the latter. The blades are formed of heavy material to withstand the heavy strains to which they are subjected, and their lower ends are rounded and sharpened.

Between the members 8 and 9 of the double beam is disposed a brace consisting of a flat metal plate 12, having its ends bent laterally at right angles and disposed against the inner faces of the members 8 and 9, and through these laterally-turned ends of the brace-plate and said members 8 and 9 are formed alining perforations, in which is engaged a bolt 13. The bolt 13 passes also through the forward end portions of handles 14 and 15, which are disposed against the outside faces of the members 8 and 9, said bolt serving to attach the forward ends of the handles to the members 8 and 9 and to hold said members 8 and 9 against outward displacement or separation.

To hold the handles 14 and 15 against vertical pivotal movement on the bolt 13, braces 16 and 17 are provided, said braces being bolted at their upper ends to the handles and at their lower ends to the members 8 and 9, respectively, at points adjacent to the stocks. The handles have a transverse brace 18 adjacent to their gripping ends 19 and 20.

To provide for attachment of draft-animals to the plow, a clevis is formed and consists of a single plate bent to form the vertically-spaced members 21 and 22, which lie against the upper and lower faces, respectively, of the forward end portions of the members 8 and 9 of the double beam, said clevis being held in place by means of the bolt 23, engaged therethrough and through the beam.

The clevis comprises also the vertical web 24, connecting the members 21 and 22, and which web is bent on a transverse line midway of the members 21 and 22 to form the forwardly-directed and laterally-extending corrugation or rib 25, having a series of perforations 26, which series extends longitudinally of the corrugation or rib. The corrugation or rib extends laterally beyond the plow-beam, so that the perforation 26 at one end of the series is directly in advance of the plow-beam, while the remaining perforations of the series lie laterally beyond the plow-beam. When a single animal is hitched to the plow, the swingletree is connected with the perforation directly in front of the plow-beam; but when other animals are added abreast the tree is shifted laterally, so that the inside horse or animal will walk in a furrow, while the other animals will walk upon the unplowed ground.

What is claimed is—

A subsoil-plow comprising a beam formed integral and including rearwardly-divergent members, the free ends of said members being curved downwardly and forwardly in close lateral spaced relation, blades secured to the downwardly and forwardly curved portions, handles disposed against the outer faces of the members of the beam, a brace consisting of a flat metal plate having its ends bent laterally and at right angles, said bent portions being perforated, the said brace being disposed between the members of the beam and having the bent portions resting against the inner sides of the members and having its perforations in alinement with the perforations in the members of the beam and the handles, and a bolt passing through the said perforations.

In testimony whereof I affix my signature in presence of two witnesses.

GEORGE W. JOHNSON.

Witnesses:
 Jos. H. Blackwood,
 Harry Ellis Chandlee.